(12) United States Patent
Doshi et al.

(10) Patent No.: US 11,100,063 B2
(45) Date of Patent: *Aug. 24, 2021

(54) SEARCHING FILES

(71) Applicant: Microsoft Technology Licensing, LLC, Redmond, WA (US)

(72) Inventors: Apurva Ashwin Doshi, Seattle, WA (US); Juan-Lee Pang, Redmond, WA (US); Bohdan W. Raciborski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/833,582

(22) Filed: Dec. 6, 2017

(65) Prior Publication Data

US 2018/0189335 A1 Jul. 5, 2018

Related U.S. Application Data

(63) Continuation of application No. 14/089,150, filed on Nov. 25, 2013, now Pat. No. 9,870,379, which is a
(Continued)

(51) Int. Cl.
*G06F 16/21* (2019.01)
*G06F 16/14* (2019.01)
*G06F 16/18* (2019.01)

(52) U.S. Cl.
CPC .......... *G06F 16/219* (2019.01); *G06F 16/148* (2019.01); *G06F 16/1873* (2019.01)

(58) Field of Classification Search
CPC .. G06F 16/219; G06F 16/1873; G06F 16/148; G06F 11/1446
See application file for complete search history.

(56) References Cited

U.S. PATENT DOCUMENTS 5,410,697 A * 4/1995 Baird ................. G06F 12/0815
710/200
5,757,360 A 5/1998 Nitta et al.
(Continued)

FOREIGN PATENT DOCUMENTS

CN 1591345 A 3/2005
CN 1732429 A 2/2006
(Continued)

OTHER PUBLICATIONS

"Notice of Allowance Issued in U.S Appl. No. 14/094,552", dated Mar. 14, 2014, 5 Pages.
(Continued)

*Primary Examiner* — Usmaan Saeed
*Assistant Examiner* — Jessica N Le
(74) *Attorney, Agent, or Firm* — Mark K. Young; Mayer & Williams, PC

(57) ABSTRACT

Aspects of the subject matter described herein relate to searching files. In aspects, a search engine is able to search not only the current files but also is able to search for deleted and previous versions of files that satisfy queries. The search engine may maintain an index that facilitates searches. In addition, the search engine may also determine not only that a file satisfies a query but what version(s) of the file satisfies the query.

16 Claims, 6 Drawing Sheets

Related U.S. Application Data continuation of application No. 12/973,949, filed on Dec. 21, 2010, now Pat. No. 8,620,894.

(56) References Cited

U.S. PATENT DOCUMENTS

| | | |
|---|---|---|
| 5,973,670 A | 10/1999 | Barber et al. |
| 5,983,171 A | 11/1999 | Yokoyama et al. |
| 6,076,051 A | 6/2000 | Messerly et al. |
| 6,079,000 A | 6/2000 | Cooper et al. |
| 6,189,016 B1 | 2/2001 | Cabrera et al. |
| 6,297,838 B1 | 10/2001 | Chang et al. |
| 6,397,308 B1 | 5/2002 | Ofek et al. |
| 6,466,901 B1 | 10/2002 | Loofbourrow et al. |
| 6,545,663 B1 | 4/2003 | Arbter et al. |
| 6,564,016 B1 | 5/2003 | Nakajima et al. |
| 6,597,347 B1 | 7/2003 | Yasutake |
| 6,625,623 B1 | 9/2003 | Midgley et al. |
| 6,629,110 B2 | 9/2003 | Cane et al. |
| 6,662,198 B2 | 12/2003 | Satyanarayanan et al. |
| 6,823,493 B2 | 11/2004 | Baker |
| 7,162,587 B2 | 1/2007 | Hiken et al. |
| 7,167,880 B2 | 1/2007 | Amano et al. |
| 7,168,001 B2 | 1/2007 | Johnson et al. |
| 7,240,104 B2 | 7/2007 | Gautney |
| 7,243,094 B2 | 7/2007 | Tabellion et al. |
| 7,272,592 B2 | 9/2007 | Wyatt et al. |
| 7,305,613 B2 * | 12/2007 | Oezgen ................ G06F 16/951 707/715 |
| 7,337,400 B1 | 2/2008 | Elbing et al. |
| 7,346,586 B1 | 3/2008 | Walmsley |
| 7,386,566 B2 | 6/2008 | Howey et al. |
| 7,441,092 B2 | 10/2008 | Lyon |
| 7,464,126 B2 | 12/2008 | Chen |
| 7,480,654 B2 | 1/2009 | Jujjuri et al. |
| 7,506,117 B2 | 3/2009 | Yamamoto et al. |
| 7,596,620 B1 | 9/2009 | Colton et al. |
| 7,613,750 B2 | 11/2009 | Valiyaparambil et al. |
| 7,660,807 B2 | 2/2010 | Prahlad et al. |
| 7,702,618 B1 | 4/2010 | Patterson |
| 7,720,819 B2 | 5/2010 | Lazzaro et al. |
| 7,797,323 B1 | 9/2010 | Eshghi et al. |
| 7,801,871 B2 | 9/2010 | Gosnell |
| 7,809,685 B2 | 10/2010 | Wolff |
| 7,822,927 B1 | 10/2010 | Scheer |
| 7,830,571 B2 | 11/2010 | Ishizuka et al. |
| 7,831,561 B2 | 11/2010 | Wertheimer et al. |
| 7,831,789 B1 | 11/2010 | Per et al. |
| 7,860,832 B2 | 12/2010 | Midgley et al. |
| 7,860,843 B2 | 12/2010 | Dodd et al. |
| 7,890,714 B1 | 2/2011 | Tsaur et al. |
| 7,899,662 B2 | 3/2011 | Brunet et al. |
| 7,900,002 B2 | 3/2011 | Lyon |
| 7,933,936 B2 | 4/2011 | Aggarwal et al. |
| 8,095,516 B2 | 1/2012 | Margolus et al. |
| 8,131,691 B1 | 3/2012 | Nagaralu et al. |
| 8,219,759 B2 | 7/2012 | Gokaraju et al. |
| 8,271,653 B2 | 9/2012 | DeHaan |
| 8,271,996 B1 | 9/2012 | Gould et al. |
| 8,296,398 B2 | 10/2012 | Lacapra et al. |
| 8,301,764 B2 | 10/2012 | Konig et al. |
| 8,332,907 B2 | 12/2012 | Canning et al. |
| 8,341,367 B2 | 12/2012 | Akirav et al. |
| 8,346,731 B1 | 1/2013 | Tsaur et al. |
| 8,375,008 B1 | 2/2013 | Gomes |
| 8,384,665 B1 | 2/2013 | Powers, III et al. |
| 8,417,746 B1 | 4/2013 | Gillett et al. |
| 8,484,356 B1 | 7/2013 | Douglis et al. |
| 8,527,556 B2 | 9/2013 | Vaitheeswaran et al. |
| 8,612,427 B2 | 12/2013 | Patterson |
| 8,620,894 B2 * | 12/2013 | Doshi ................ G06F 11/1446 707/706 |
| 8,627,025 B2 | 1/2014 | Doshi et al. |
| 8,788,774 B2 | 7/2014 | Doshi et al. |
| 9,229,818 B2 | 1/2016 | Doshi et al. |
| 9,824,091 B2 | 11/2017 | Boehm et al. |
| 9,870,379 B2 * | 1/2018 | Doshi ................ G06F 11/1446 |
| 10,417,337 B2 * | 9/2019 | Dusberger ............ G06F 16/313 |
| 2001/0001870 A1 | 5/2001 | Ofek et al. |
| 2001/0038376 A1 | 11/2001 | Sato |
| 2002/0073137 A1 | 6/2002 | Meadway et al. |
| 2002/0161908 A1 | 10/2002 | Benitez et al. |
| 2004/0010524 A1 | 1/2004 | Wallace et al. |
| 2004/0024778 A1 | 2/2004 | Cheo |
| 2004/0030727 A1 | 2/2004 | Armangau et al. |
| 2004/0059870 A1 | 3/2004 | Ash et al. |
| 2004/0088331 A1 | 5/2004 | Therrien et al. |
| 2004/0088508 A1 | 5/2004 | Ballard et al. |
| 2004/0093323 A1 | 5/2004 | Bluhm et al. |
| 2004/0133544 A1 | 7/2004 | Kiessig et al. |
| 2004/0210607 A1 | 10/2004 | Manchanda et al. |
| 2005/0015466 A1 | 1/2005 | Tripp |
| 2005/0050054 A1 | 3/2005 | Clark et al. |
| 2005/0076066 A1 | 4/2005 | Stakutis et al. |
| 2005/0091271 A1 | 4/2005 | Srinivas et al. |
| 2005/0187891 A1 | 8/2005 | Johnson et al. |
| 2005/0193031 A1 | 9/2005 | Midgley et al. |
| 2005/0203851 A1 | 9/2005 | King et al. |
| 2005/0210041 A1 | 9/2005 | Taguchi |
| 2006/0053182 A1 | 3/2006 | Sen et al. |
| 2006/0053347 A1 | 3/2006 | van ingen et al. |
| 2006/0101384 A1 | 5/2006 | Sim-tang et al. |
| 2006/0106813 A1 | 5/2006 | Blumenau et al. |
| 2006/0116985 A1 | 6/2006 | Thind et al. |
| 2006/0117048 A1 | 6/2006 | Thind et al. |
| 2006/0117049 A1 | 6/2006 | Jain et al. |
| 2006/0117056 A1 | 6/2006 | Havewala et al. |
| 2006/0129618 A1 | 6/2006 | Maier |
| 2006/0248039 A1 | 11/2006 | Brooks et al. |
| 2006/0248067 A1 | 11/2006 | Brooks et al. |
| 2006/0271602 A1 | 11/2006 | Davis et al. |
| 2007/0027935 A1 | 2/2007 | Haselton et al. |
| 2007/0028063 A1 | 2/2007 | Hars et al. |
| 2007/0038857 A1 | 2/2007 | Gosnell |
| 2007/0043715 A1 * | 2/2007 | Kaushik ................ G06F 16/24 |
| 2007/0136381 A1 | 6/2007 | Cannon et al. |
| 2007/0186127 A1 | 8/2007 | Desai et al. |
| 2007/0208918 A1 | 9/2007 | Harbin et al. |
| 2007/0214886 A1 | 9/2007 | Sheynblat |
| 2007/0248029 A1 | 10/2007 | Merkey et al. |
| 2007/0276843 A1 | 11/2007 | Lillibridge et al. |
| 2008/0010322 A1 | 1/2008 | Lee et al. |
| 2008/0034004 A1 | 2/2008 | Cisler et al. |
| 2008/0034268 A1 | 2/2008 | Dodd et al. |
| 2008/0077570 A1 * | 3/2008 | Tang ................ G06F 16/3346 |
| 2008/0091655 A1 * | 4/2008 | Gokhale ............. G06F 16/2228 |
| 2008/0091895 A1 | 4/2008 | Chen |
| 2008/0114730 A1 | 5/2008 | Larimore et al. |
| 2008/0183773 A1 | 7/2008 | Choy |
| 2008/0243936 A1 | 10/2008 | Li et al. |
| 2008/0256140 A1 | 10/2008 | Lazzaro et al. |
| 2008/0263103 A1 | 10/2008 | Mcgregor et al. |
| 2008/0270396 A1 * | 10/2008 | Herscovici ............ G06F 16/313 |
| 2008/0288531 A1 | 11/2008 | Turski et al. |
| 2009/0048860 A1 | 2/2009 | Brotman et al. |
| 2009/0089862 A1 | 4/2009 | Sun |
| 2009/0100115 A1 | 4/2009 | Park et al. |
| 2009/0172273 A1 | 7/2009 | Piszczek et al. |
| 2009/0187545 A1 | 7/2009 | Kaku et al. |
| 2009/0199199 A1 | 8/2009 | Pooni et al. |
| 2009/0204586 A1 | 8/2009 | Takahashi |
| 2009/0216798 A1 | 8/2009 | Wahlert et al. |
| 2009/0228533 A1 | 9/2009 | Reddy et al. |
| 2009/0228777 A1 * | 9/2009 | Henry ................ G06F 16/40 715/230 |
| 2009/0235150 A1 | 9/2009 | Berry |
| 2009/0248757 A1 | 10/2009 | Havewala et al. |
| 2009/0289110 A1 | 11/2009 | Regen et al. |
| 2009/0292677 A1 | 11/2009 | Kim |
| 2009/0319688 A1 | 12/2009 | Mason et al. |
| 2010/0061250 A1 | 3/2010 | Nugent |
| 2010/0070515 A1 | 3/2010 | Dutton et al. |
| 2010/0083109 A1 | 4/2010 | Tse et al. |
| 2010/0106691 A1 | 4/2010 | Preslan et al. |
| 2010/0145917 A1 | 6/2010 | Bone et al. |

(56) References Cited

U.S. PATENT DOCUMENTS

| | | |
|---|---|---|
| 2010/0153313 A1 | 6/2010 | Baldwin et al. |
| 2010/0161617 A1 | 6/2010 | Cao et al. |
| 2010/0169591 A1 | 7/2010 | Atluri et al. |
| 2010/0274765 A1 | 10/2010 | Murphy et al. |
| 2010/0280999 A1 | 11/2010 | Atluri et al. |
| 2010/0306171 A1 | 12/2010 | Antos et al. |
| 2011/0010499 A1 | 1/2011 | Tsukamoto et al. |
| 2011/0016095 A1 | 1/2011 | Anglin et al. |
| 2011/0055559 A1 | 3/2011 | Li et al. |
| 2011/0066805 A1 | 3/2011 | Janschitz et al. |
| 2011/0113012 A1 | 5/2011 | Gruhl et al. |
| 2011/0113466 A1* | 5/2011 | Stringham .......... G06F 21/6227 726/1 |
| 2011/0131185 A1 | 6/2011 | Kirshenbaum |
| 2011/0173160 A1 | 7/2011 | Kryger |
| 2011/0225141 A1 | 9/2011 | Chaudhry et al. |
| 2011/0246721 A1 | 10/2011 | Crisan |
| 2011/0264635 A1 | 10/2011 | Yang |
| 2011/0264875 A1 | 10/2011 | Watanabe |
| 2012/0016778 A1 | 1/2012 | Salle et al. |
| 2012/0030247 A1 | 2/2012 | Yambal et al. |
| 2012/0069131 A1 | 3/2012 | Abelow |
| 2012/0078855 A1 | 3/2012 | Beatty et al. |
| 2012/0078914 A1 | 3/2012 | Roeder et al. |
| 2012/0130995 A1 | 5/2012 | Risvik et al. |
| 2012/0143824 A1 | 6/2012 | Doshi et al. |
| 2012/0143825 A1 | 6/2012 | Boehm et al. |
| 2012/0150864 A1* | 6/2012 | Palakodety ............. G06F 16/31 707/741 |
| 2012/0159078 A1 | 6/2012 | Doshi et al. |
| 2012/0210084 A1 | 8/2012 | Carroll et al. |
| 2013/0018928 A1 | 1/2013 | Lacapra et al. |
| 2013/0024423 A1 | 1/2013 | Doshi et al. |
| 2013/0066830 A1 | 3/2013 | Lacapra et al. |
| 2013/0066929 A1 | 3/2013 | Sedlar et al. |
| 2013/0191342 A1 | 7/2013 | Sreedharan |
| 2013/0227604 A1 | 8/2013 | Shields et al. |
| 2014/0074809 A1 | 3/2014 | Patterson |
| 2014/0095798 A1 | 4/2014 | Doshi et al. |
| 2014/0188811 A1 | 7/2014 | Yang et al. |

FOREIGN PATENT DOCUMENTS

| | | |
|---|---|---|
| CN | 1783025 A | 6/2006 |
| CN | 1783082 A | 6/2006 |
| CN | 1784677 A | 6/2006 |
| CN | 1991776 A | 7/2007 |
| CN | 101162469 A | 4/2008 |
| CN | 101201766 A | 6/2008 |
| CN | 101326497 A | 12/2008 |
| CN | 201233581 Y | 5/2009 |
| CN | 101601029 A | 12/2009 |
| JP | 2007140777 A | 6/2007 |
| KR | 1020090063733 A | 6/2009 |
| WO | 2004059572 A2 | 7/2004 |
| WO | 2007021842 A2 | 2/2007 |
| WO | 2010066816 A2 | 6/2010 |

OTHER PUBLICATIONS

"Non-Final Office Action Issued in U.S. Appl. No. 14/094,552", dated Feb. 14, 2014, 7 Pages.
"First Office Action and Search Report Issued in Chinese Patent Application No. 201110394985.7", dated May 26, 2014, 12 Pages.
"Notice of Allowance Issued in Chinese Patent Application No. 201110394985.7", dated Sep. 22, 2015 4 Pages.
"Second Office Action Issued in Chinese Patent Application No. 201110394985.7", dated Feb. 28, 2015, 7 Pages.
Xu, et al., "File Level Backup System Based on Content-addressed Storage", In Computer Engineering, vol. 36, Issue 16, Aug. 2010, 4 Pages.
Xing-Hua, et al. "Duplicated Data Detection in Multi-Version Backup", In Application Research of Computers (Abstract only), Jan. 2009, 4 Pages.
Takasugi, et al., "Seamless Service Platform for Following a User's Movement in a Dynamic Network Environment", In Proceedings of the 1st IEEE International Conference on Pervasive Computing and Communications, Mar. 23, 2003, 8 Pages.
Soules, et al., "Metadata Efficiency in Versioning File Systems", In Proceedings of the 2nd USENIX Conference on File and Storage Technologies, Mar. 31, 2003, 4 Pages.
Satyanarayanan, et al., "Towards Seamless Mobility on Pervasive Hardware", In Pervasive and Mobile Computing, Mar. 2005, pp. 157-189.
Redi, et al., "Mobile IP: A Solution for Transparent, Seamless Mobile Computer Communication", In Fuji-Keizai's Report on Upcoming Trends in Mobile Computing and Communications, Jul. 1998, 10 Pages.
"First Office Action and Search Report Issued in Chinese Patent Application No. 201110395113.2", dated Nov. 28, 2013, 8 Pages.
"Notice of Allowance Issued in Chinese Patent Application No. 201110395113.2", dated Jun. 3, 2015, 3 Pages.
Rebbapragada, Narasu, "First Look: Tiger Lives Up to the Hype", <<http://www.pcworld.com/article/120646/first_look_tiger_lives_up_to_the_hype.html>>, Apr. 30, 2005, 2 Pages.
"Office Action Issued in Chinese Patent Application No. 201110395113.2", dated Aug. 8, 2014, 7 Pages.
"International Search Report and Written Opinion Issued in PCT Application No. PCT/US2011/063195", dated Jul. 24, 2012, 9 Pages.
"Third Office Action Issued in Chinese Patent Application No. 201110395113.2", dated Feb. 10, 2015, 6 Pages.
"First Office Action and Search Report Issued in Chinese Patent Application No. 201110432322.X", dated Dec. 17, 2013, 10 Pages.
"Notice of Allowance Issued in Chinese Application No. 201110432322X", dated Mar. 18, 2015, 3 Pages.
"Second Office Action Issued in Chinese Patent Application No. 201110432322.X", dated Aug. 28, 2014, 13 Pages.
"Notice of Allowance Issued in China Patent Application No. 201110432331.9", dated Sep. 22, 2014, 3 Pages.
"Office Action and Search Report Issued in China Patent Application No. 201110432331.9", dated Jan. 6, 2014, 9 Pages.
Babineau, Brian, "Next Generation NAS: A Market Perspective on the Recently Introduced Snap Server 500 Series", Enterprise Strategy Group, Jun. 2006, 5 Pages.
Cooperstein, et al.,"Keeping an Eye on Your NTFS Drives: the Windows 2000 Change Journal Explained", Retreived from: <<https://web.archive.org/web/20030901114028/https://www.microsoft.com/msj/0999/journal/journal.aspx>>, Sep. 1999, 13 Pages.
Hejtmanek, Lukas, "Scalable and Distributed Data Storage", In PhD Thesis Proposal, Masaryk University, Jan. 2005, 33 Pages.
Jones, Tim, "Build a Web spider on Linux", Retrieved from: <<http://web.archive.org/web/20061130134627/http://www-128.ibm.com/developerworks/linux/library/l-spider/>>, Nov. 14, 2006, 14 Pages.
Liang, et al., "Video Plug-in Development for Material Exchange Format", In Video Engineering, vol. 31, Issue 5, May 31, 2005, 4 Pages.
"International Search Report and Written Opinion Issued in PCT Application No. PCT/US2011/063050", dated Jul. 25, 2012, 9 Pages.
"About Google Desktop Search", Retrieved from: http://web.archive.org/web/20041015131838/http://desktop.google.com/about.html, Oct. 15, 2004, 8 Pages.
"Base of a Differential Backup", Retrieved from: <<https://technet.microsoft.com/en-us/library/ms188230(v=sql.105).aspx>>, Apr. 10, 2012, 1 Page.
Anita, "Copemic Desktop Search Has a New Improved Index", Retrieved from: <<http://forum.copernic.com/index.php/cds-new-improved-index/>>, Jul. 29, 2010, 6 Pages.
"Desktop Search Tools", Retrieved from: <<http://www.pandia.com/articles/desktop-search>>, 2004, 3 Pages.
"Google—Data Retention Periods for Different Services (Including Deleted Data)", Tech and Law, Nov. 6, 2010, 8 Pages.

(56) References Cited

OTHER PUBLICATIONS

"Google Desktop Search", Retrieved from: <<http://web.archive.org/web/20100924031219/http://www.pandia.com/resources/desktop.html>>, Retrieved Date: Sep. 22, 2010, 6 Pages.

"Introduction to Microsoft Sync Framework File Synchronization Provider", Retrieved from: <<http://msdn.microsoft.com/en-us/sync/bb887623>>, Oct. 2009, 5 Pages.

"Prevent Data Loss with Axcient: Fast Data Loss Recovery from the Unexpected", Retrieved from: <<http://preventdataloss.net/>>, May 11, 2010, 2 Pages.

"Windows Search Overview", Retrieved from: https://msdn.microsoft.com/en-us/library/windows/desktop/aa965362 (v=vs.85).aspx, Retrieved Date: Sep. 22, 2010, 5 Pages.

"Notice of Allowance in Korean Patent Application No. 10-2013-7014151", dated Jan. 19, 2018, 3 Pages.

"Office Action Issued in Korean Patent Application No. 10-2013-7014151", dated Aug. 17, 2017, 9 Pages.

"Extended Search Report Received in European Patent Application No. 11845344.8", dated Sep. 15, 2014, 12 Pages.

"Notice of Allowance Issued in European Patent Application No. 11845344.8", dated May 21, 2015, 7 Pages.

"Extended Search Report Issued in European Patent Application No. 11845849.6", dated May 19, 2017, 9 Pages.

"Final Office Action Issued in U.S. Appl. No. 12/958,412", dated Jul. 25, 2013, 24 Pages.

"Final Office Action Issued in U.S. Appl. No. 12/958,412", dated May 5, 2015, 12 Pages.

"Non-Final Office Action Issued in U.S. Appl. No. 12/958,412", dated Oct. 21, 2015, 18 Pages.

"Non-Final Office Action Issued in U.S. Appl. No. 12/958,412", dated Apr. 21, 2016, 18 Pages.

"Non-Final Office Action Issued in U.S. Appl. No. 12/958,412", dated Oct. 8, 2014, 11 Pages.

"Non-Final Office Action Issued in U.S. Appl. No. 12/958,412", dated Dec. 28, 2012, 16 Pages.

"Non-Final Office Action Issued in U.S Appl. No. 12/959,401", dated Jan. 17, 2017, 13 Pages.

"Notice of Allowance Issued in U.S Appl. No. 12/959,401", dated Jul. 25, 2017, 13 Pages.

"Final Office Action Issued in U.S. Appl. No. 12/959,401", dated Jul. 18, 2013, 30 Pages.

"Final Office Action Issued in U.S. Appl. No. 12/959,401", dated Sep. 12, 2014, 29 Pages.

"Non-Final Office Action Issued in U.S. Appl. No. 12/959,401", dated Mar. 26, 2014, 28 Pages.

"Non-Final Office Action Issued in U.S. Appl. No. 12/959,401", dated Dec. 6, 2012, 29 Pages.

"Final Office Action Issued in U.S. Appl. No. 12/973,902", dated May 16, 2013, 8 Pages.

"Non-Final Office Action Issued in U.S. Appl. No. 12/973,902", dated Feb. 27, 2013, 8 Pages.

"Notice of Allowance Issued in U.S. Appl. No. 12/973,902", dated Aug. 28, 2013, 8 Pages.

"Notice of Allowance Issued in U.S. Appl. No. 12/973,949", dated Jun. 25, 2013, 19 Pages.

"Notice of Allowance Issued in U.S. Appl. No. 12/973,949", dated Aug. 20, 2012, 17 Pages.

"Final Office Action Issued in U.S. Appl. No. 13/186,490", dated Jun. 12, 2014, 15 Pages.

"Final Office Action Issued in U.S. Appl. No. 13/186,490", dated Oct. 16, 2013, 26 Pages.

"Non-Final Office Action Issued in U.S. Appl. No. 13/186,490", dated Mar. 21, 2014, 11 Pages.

"Non-Final Office Action Issued in U.S. Appl. No. 13/186,490", dated Sep. 24, 2014, 11 Pages.

"Non-Final Office Action Issued in U.S. Appl. No. 13/186,490", dated Jun. 12, 2013, 23 Pages.

"Notice of Allowance Issued in U.S. Appl. No. 13/186,490", dated Jan. 8, 2015, 15 Pages.

"Notice of Allowance Issued in U.S. Appl. No. 13/186,490", dated Sep. 2, 2015, 8 Pages.

"Non-Final Office Action Issued in U.S. Appl. No. 14/085,699", dated May 8, 2015, 14 Pages.

"Final Office Action Issued in U.S. Appl. No. 14/085,699", dated Aug. 28, 2015, 13 Pages.

"Non-Final Office Action Issued in U.S. Appl. No. 14/089,150", dated May 15, 2017, 14 Pages.

"Final Office Action Issued in U.S. Appl. No. 14/089,150", dated Jan. 11, 2017, 18 Pages.

"Final Office Action Issued in U.S. Appl. No. 14/085,699", dated Jan. 8, 2015, 12 Pages.

Non-Final Office Action Issued in U.S. Appl. No. 14/085,699, dated Jul. 8, 2015, 13 Pages.

"Non-Final Office Action Issued in U.S. Appl. No. 14/089,150", dated Jun. 30, 2016, 17 Pages.

"Non-Final Office Action Issued in U.S. Appl. No. 14/089,150", dated Mar. 27, 2015, 12 Pages.

"Notice of Allowance Issued in U.S. Appl. No. 14/089,150", dated Sep. 28, 2017, 8 Pages.

"Final Office Action Issued in U.S. Appl. No. 14/089,150", dated Aug. 27, 2015, 14 Pages.

"Final Office Action Issued in U.S. Appl. No. 14/089,150", dated Nov. 25, 2014, 11 Pages.

"Non-Final Office Action Issued in U.S. Appl. No. 14/089,150", dated Aug. 22, 2014, 14 Pages.

"A New Way to Interact with the Cloud", Retrieved from <<https://web.archive.org/web/20160406024426/http://research.microsoft.com/en-us/news/features/030419-clientcloud.aspx>>, Aug. 4, 2010, 2 Pages.

"Cloud Mouse to enable 3D interaction with data (Mar. 2010)", Retrieved from <<https://web.archive.org/web/20101007192250/http://emergingtechnologies.becta.org.uk/index.php?section=etn&rid=15254>>, Aug. 4, 2010, 3 Pages.

"Inside the Cloud", Retrieved from <<https://web.archive.org/web/20150907192227/http://research.microsoft.com/en-us/projects/cloudmouse/>>, Aug. 4, 2010, 2 Pages.

"Sixth Sense Technology—Projection Interface Device—Must See!!", Retrieved from <<http://www.abovetopsecret.com/forum/thread587768/pg>>, Aug. 6, 2010, 18 Pages.

"Final Office Action Issued in U.S. Appl. No. 12/965,652", dated Apr. 24, 2017, 23 Pages.

"Final Office Action Issued in U.S. Appl. No. 12/965,652", dated Aug. 9, 2013, 17 Pages.

"Final Office Action Issued in U.S. Appl. No. 12/965,652", dated Aug. 28, 2015, 24 Pages.

"Non-Final Office Action Issued in U.S. Appl. No. 12/965,652", dated Sep. 22, 2016, 22 Pages.

"Non-Final Office Action Issued in U.S. Appl. No. 12/965,652", dated May 8, 2014, 6 Pages.

"Non-Final Office Action Issued in U.S. Appl. No. 12/965,652", dated Jan. 9, 2015, 22 Pages.

"Non-Final Office Action Issued in U.S. Appl. No. 12/965,652", dated Jan. 17, 2013, 15 Pages.

"First Office Action and Search Report Issued in Chinese Patent Application No. 201110462793.5", dated Feb. 8, 2014, 14 Pages.

"Fourth Office Action and Search Report Issued in Chinese Patent Application No. 201110462793.5", dated Nov. 9, 2015, 10 Pages.

"Notice of Allowance Issued in Chinese Patent Application No. 201110462793.5", dated Apr. 6, 2016, 4 Pages.

"Second Office Action Issued in Chinese Patent Application No. 201110462793.5", dated Oct. 8, 2014, 11 Pages.

"Third Office Action and Search Report Issued in Chinese Patent Application No. 201110462793.5", dated Apr. 17, 2015, 15 Pages.

"Non-Final Office Action Issued in U.S. Appl. No. 12/965,652", dated Mar. 22, 2018, dated 32 Pages.

Cliff, Dave, "Remotely Hosted Services and Cloud Computing", Retrieved from <<http://www.cs.bris.ac.uk/home/dc/cliff_becta_clouds.pdf>>, Jun. 2010, 23 Pages.

* cited by examiner

SEARCHING FILES

RELATED APPLICATION

This application is a continuation of U.S. Ser. No. 14/089,150, filed Nov. 25, 2013, entitled, "SEARCHING FILES" which is a continuation of U.S. Ser. No. 12/973,949, filed on Dec. 21, 2010, entitled "SEARCHING FILES", now U.S. Pat. No. 8,620,894, both of which are incorporated herein by reference in their entirety.

BACKGROUND

Computers may be used to store a wealth of information. This information may be included, for example, in documents, spreadsheets, images, databases, e-mails, other content, and the like. Some users use a hierarchical folder/file system to organize their data on a storage device so that they can better find the data later. Other users place much of their data in relatively few directories. In either case, as time passes, the difficulty of remembering where data was stored increases.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to searching files. In aspects, a search engine is able to search not only the current files but also is able to search for deleted and previous versions of files that satisfy queries. The search engine may maintain an index that facilitates searches. In addition, the search engine may also determine not only that a file satisfies a query but what version(s) of the file satisfies the query.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth are used. The use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

EXEMPLARY OPERATING ENVIRONMENT

Figure 1:
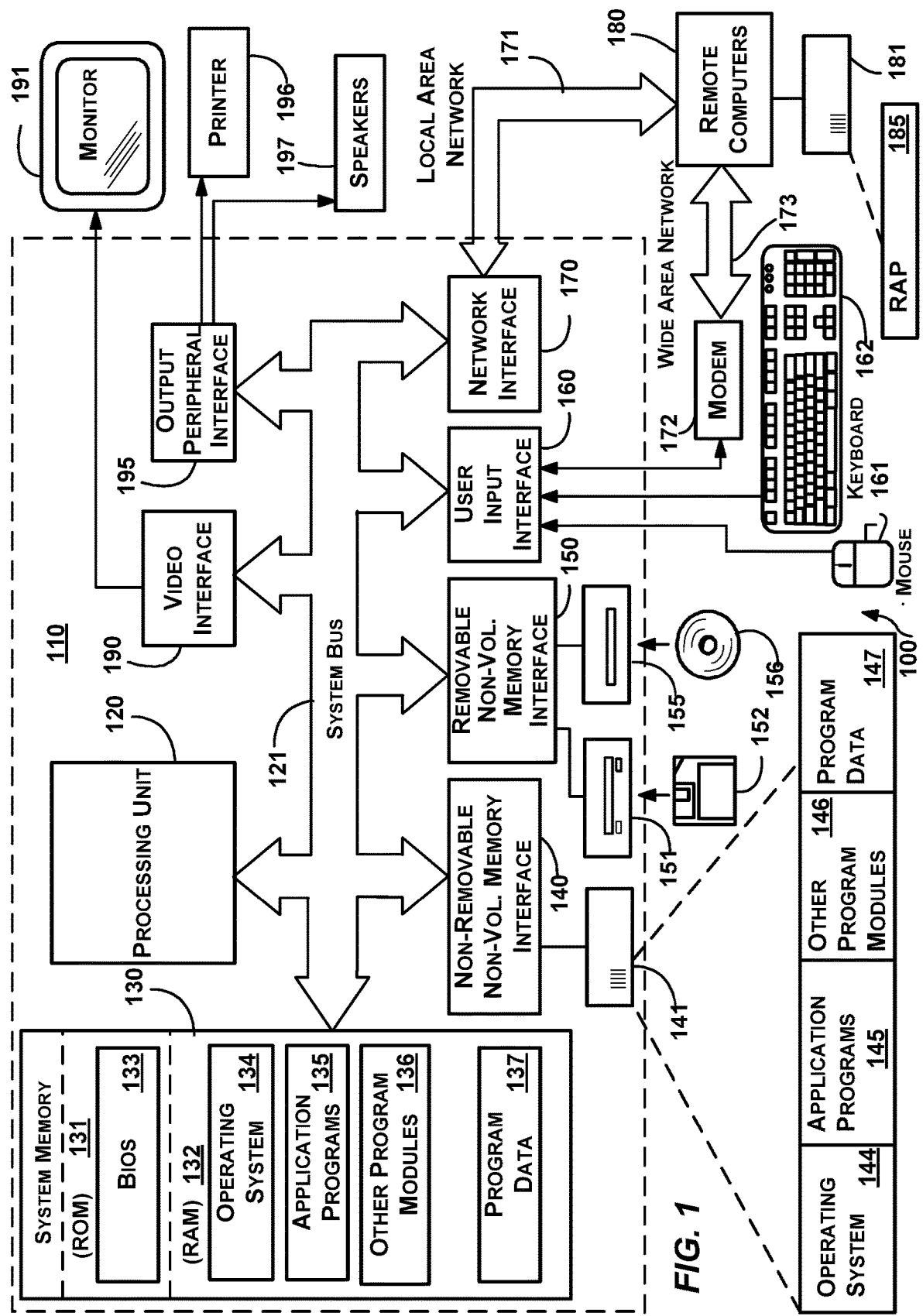
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Finding Data

Figure 2:
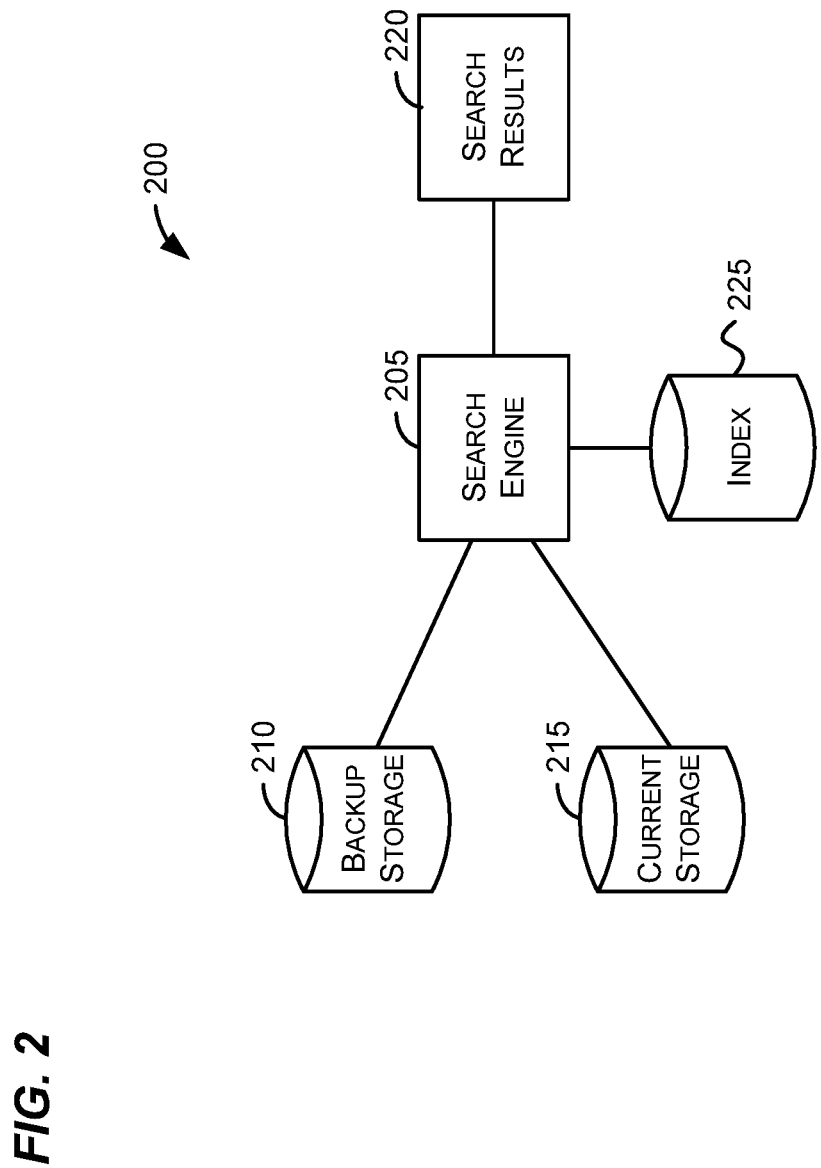
FIG. 2 is a block diagram that generally represents a system in accordance with aspects of the subject matter described herein.

As mentioned previously, remembering where data was stored becomes more difficult with time. FIG. 2 is a block diagram that generally represents a system in accordance with aspects of the subject matter described herein. As illustrated, the system 200 includes a search engine 205, backup storage 210, current storage 215, and may also include other components (not shown). Logically, the search engine 205 searches the files stored in the backup storage 210 and the current storage 215 to generate the search results 220.

The search engine 205 may be hosted on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the search engine 205 comprises the computer 110 of FIG. 1.

The backup storage 210 and the current storage 215 (hereinafter sometimes collectively referred to as the file storage) may include any storage media capable of storing data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like. The file storage may be implemented using the computer storage media described in conjunction with FIG. 1.

The file storage may be internal, external, or include components that are both internal and external to an apparatus hosting the search engine 205.

The file storage may include one or more physical devices that are of the same or different types. An apparatus such as a computer hosting the search engine 205 may rely on the current storage 215 as the default storage to store file system objects such as files and directories or other data (hereinafter sometimes referred to as files). Files from the current storage 215 may be backed up onto the backup storage 210.

The current storage 215 may include files that are currently being used by a computer, for example. When a file is added, the current storage 215 may include the added file. When a file is deleted, the file may be removed from the current storage 215.

The backup storage 210, on the other hand, may include previous versions of files that are currently contained on the current storage 215 as well as versions of files that have been deleted from the current storage 215.

In responding to a query, the search engine 205 may logically search the files of the current storage 215 as well as the files of the backup storage 210. The term "logically" is used as there may be many ways to search the contents of the backup storage 210 and the current storage 215. For example, in one embodiment, the search engine 205 may search each file of the current storage 215 as well as each file of the backup storage 210 in response to a query. If a file satisfies the conditions of the query, an indicator of the file (e.g., the file name and potentially version) may be included in the search results 220.

As another example, the search engine 205 may search the backup storage 210 and the current storage 215 by searching the index 225. The index 225 may include a set of keywords that are mapped to one or more files in the current storage 215 and the backup storage 210. When a file is updated in the current storage 215, the old indexing to the file may be deleted from the index 225 and the new contents of the file may be indexed and placed in the index 225.

When a file is deleted, copies of previous versions of the file may be maintained on the backup storage 210. In one embodiment, only the latest version of the deleted file in the backup storage 210 is indexed into the index 225. In another embodiment, each deleted version of a deleted file is indexed into the index 225. For example, if a file is deleted, re-created, and deleted again, both deleted versions may be indexed into the index 225. In this example, when the search engine 205 receives a query, the search engine may search all files that currently exist on the current storage 215 as well the latest version of files that have been deleted from the current storage 215 by searching the index 225.

Figure 3:
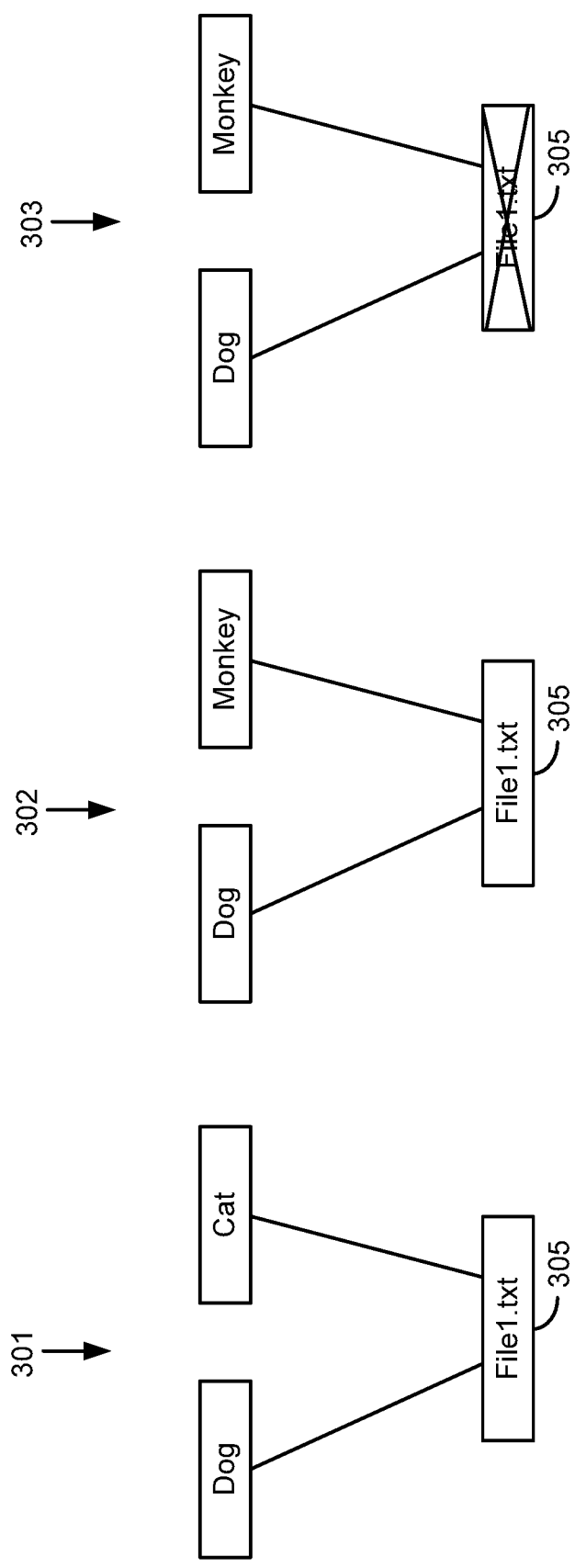
FIG. 3 is a block diagram that illustrates a portion of an exemplary index in which some versions of files may be missed in a search in accordance with aspects of the subject matter described herein.

Searching in this manner may yield less than all versions of files that would have satisfied the query (as described in more detail in conjunction with FIG. 3). For example, if a user deletes a word from a file and saves the file, and if the deleted word is needed to satisfy the query, the query will not return the file even though a previous version of the file would have satisfied the query.

The phrase "satisfy the query" or the like is sometimes used herein. Satisfying the query means satisfying the conditions of the query. For example, a query may include a list of conditions. For example, a user may want to have a listing of all files with the name that includes "Resume". In this case, the user may issue a query that includes a condition that the name of the file includes "Resume". This query is satisfied by all versions of files that include the name "Resume" in their name.

FIG. 3 is a block diagram that illustrates a portion of an exemplary index in which some versions of files may be missed in a search in accordance with aspects of the subject matter described herein. Turning to FIG. 3, at time 301, the file 305 includes the words dog and cat. An index may have the tokens dog and cat that reference the file 305. At time 302, the file 305 includes the words dog and monkey. At this time, an index may have the tokens dog and monkey that reference the file 305. At time 303 the file 305 is deleted. At this time, the index may still include the tokens dog and monkey (which may refer to a deleted version of the file 305). Using the technique above, a search for files that include the word cat would not yield the file 305 at time 303, even though cat was included in the file 305 at time 301.

In some implementations, the above behavior may be acceptable--particularly for a first pass in searching for files. In other implementations, a more exhaustive search of older and deleted versions may be needed.

Figure 4:
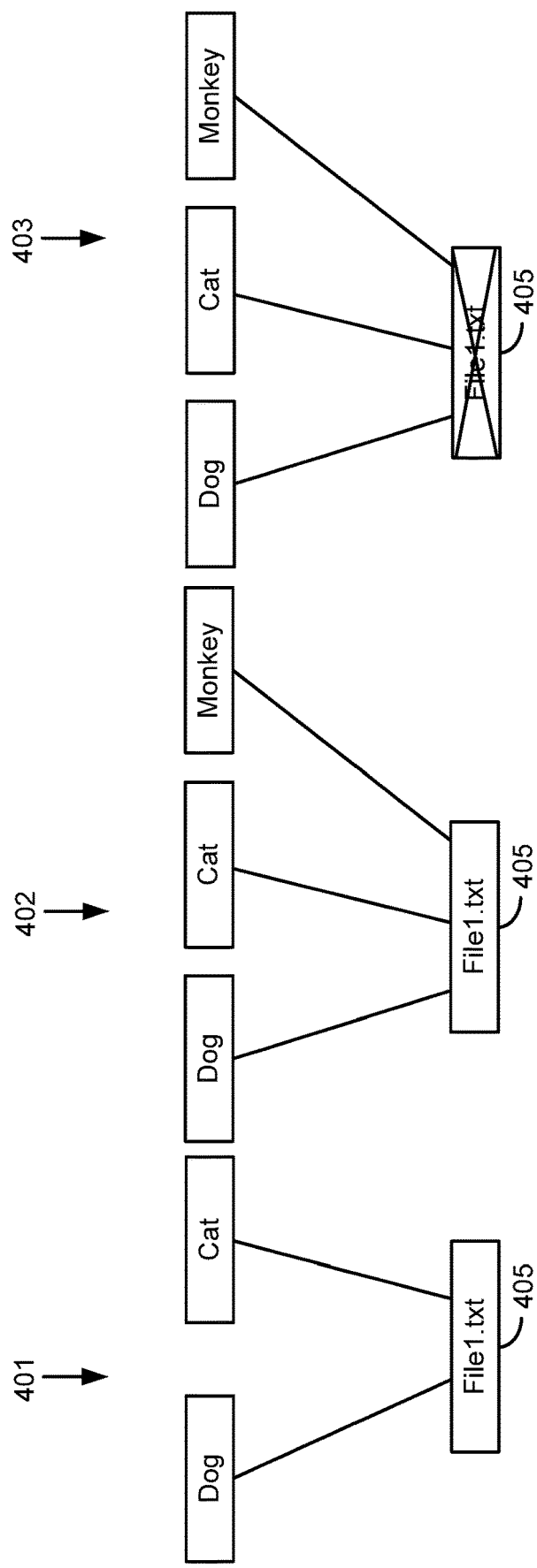
FIG. 4 is a block diagram that illustrates a portion of an exemplary index that may be used for a more exhaustive search in accordance with aspects of the subject matter described herein.

FIG. 4 is a block diagram that illustrates a portion of an exemplary index that may be used for a more exhaustive search in accordance with aspects of the subject matter described herein. In this example, when a file 405 is modified at time 402, instead of deleting the previous references from the index to the file, all references for any old tokens (e.g., cat) for the file are kept and tokens for any new words found in the file (e.g., monkey) are added to the index. When a file is deleted at time 403, the references from all the previous tokens in the index to the file are maintained. This allows a search for keywords were ever contained in the file.

The block referenced by numeral 405 may comprise an object that represents versions of the file. This object may comprise a data structure that includes, for example, an identifier of the file such as a name that can be used to find versions of the file using a catalog as described in more detail below.

Turning to FIG. 2, to accomplish this more exhaustive search capability, in one implementation, when a file is first backed up to the backup storage 210, the file is indexed and added to an index data structure. When another version of the file is backed up to the backup storage 210, all old indexes for the file are maintained in the index 225 while any new tokens and references for new words contained in the file are added to the index 225.

When the file is deleted, in one implementation, before deleting the file from the current storage 215, the file as it existed just prior to being deleted is copied to the backup storage 210 and indexing proceeds as described above as if the file had changed. This indexing captures any new tokens that may have been added to the file after the last version stored on the backup storage but before the file was deleted. Thereafter, the file may be deleted from the current storage 215. This implementation may be used to search for all keywords that existed in any backed up version of the file up to its deletion time.

In another implementation, when a file is deleted, the file is not copied to the backup storage 210 prior to deletion, but the references from tokens to the last version of the file in the backup storage 210 are maintained and not deleted. This implementation may lose search capability for changes that occurred between the last version backed up on the backup storage 210 and the version that existed on the current storage 215 just prior to deletion.

The more exhaustive search mechanism above may indicate that at least one version of a file satisfies a search query without indicating which particular version(s) satisfy the search query. For example, when tokens are added to an index for changes made to a file, the tokens may reference an object that represents the versions of the file. For example, this object may include a data structure that includes an identifier such as a name that identifies the file but that does not directly identify a particular version of the file. To determine the particular version(s) that satisfy the search query, the current version of the file may be searched in the current storage 215 and the previous versions of the file may be searched in the backup storage 210. Specific versions of the file that satisfy the query may then be located and returned.

One exemplary mechanism that may be used to catalog versions of a file and obtain the versions based on the name of the file is disclosed in a U.S. patent application entitled "FILE SYSTEM BACKUP USING CHANGE JOURNAL," filed Dec. 3, 2010, having Ser. No. 12/959,401, which application is assigned to the assignee of this patent application and hereby incorporated by reference. Based on the teachings herein, those skilled in the art may recognize other mechanisms for implementing this capability that may be utilized without departing from the spirit or scope of aspects of the subject matter described herein.

In one embodiment, the search engine 205 may update the index 225 upon an event including: 1) A file in the current storage 215 is changed; or 2) A file is copied to the backup storage. In the first case, the tokens that refer to no other files and the in the index that reference the file that has changed in the current storage 215 may be deleted and new tokens and references may be created based on the new contents of the file. In the second case, all old tokens and references may be kept and one or more elements may be added for content that is new since the last version of the file. In this implementation, the search engine 205 may use just the index 225 to find files (or objects that represent multiple versions of files) to satisfy a query. Once a file has been found, additional information such as the catalog disclosed in the above-mentioned U.S. patent application may be consulted to determine what versions of the file satisfy the query.

A data protection engine (not shown) that creates backup versions of files on the backup storage 210 may be configured to copy only protected files from the current storage 215. Protected files may be designated individually and/or as files that are descendants of directories that are designated as protected. For example, the file c:\mydata.txt may be individually designated as protected and the directory c:\mydata may be designated as protected. In the latter case, all files that exist in c:\mydata or any of its subdirectories or their subdirectories may be protected.

In this case, the current storage 215 stores current versions of files, the backup storage 210 stores previous versions of protected files of the current storage 215 as well as versions of protected files that have been deleted from the current storage 215.

Furthermore, how the search engine 205 updates the index 225 based on a changed file may be determined by whether the changed file is a protected file or a non-protected file. For example, in response to an indication that a non-protected file has changed, the search engine 205 may perform actions, including:

1. Deleting from the index 225 prior references to the non-protected file. These prior references exist prior to when the non-protected file was changed;

2. Deleting from the index 225 prior tokens that only reference the non-protected file. In other words, if a token only references the non-protected file that was changed, the token may be deleted;

3. Adding to the index 225 new tokens for each token found in the non-protected file after the non-protected file was changed; and 4. Adding to the index 225 references from tokens of the index to the non-protected file where corresponding tokens exist in the non-protected file after the non-protected file was changed. For example, for each token found in a file, a corresponding token in the index 225 is updated to reference the file.

If the file is a protected file that is being copied the backup storage, the search engine 205 may perform actions, including:

1. Maintaining any references from tokens in the index to an object that represents versions of the file. In other words, references to the file are not deleted as previously described in conjunction with FIG. 4;

2. Adding new tokens to the index 225 for each token found in the new version of the file. For example, if the file includes tokens that are not currently found in the index 225, these tokens may be added to the index 225; and 3. Adding to the index 225 references from the new tokens to the object that represents versions of the file. For example, this refers to adding additional references to the file for each new token found in the file.

When a protected file is deleted from the current storage, the search engine 205 may maintain the index such that any references from tokens in the index to an object that represents the deleted file are kept.

Searches may be performed in multiple stages. In a first stage, the search engine 205 may search the current storage to find current versions that satisfy a query and search the backup storage to find deleted files that satisfy the query. Afterwards, if a more exhaustive search is desired, the search engine 205 may conduct a search that includes previous versions of protected files (e.g., by creating and searching an index that includes all tokens of the protected files).

Figure 5:
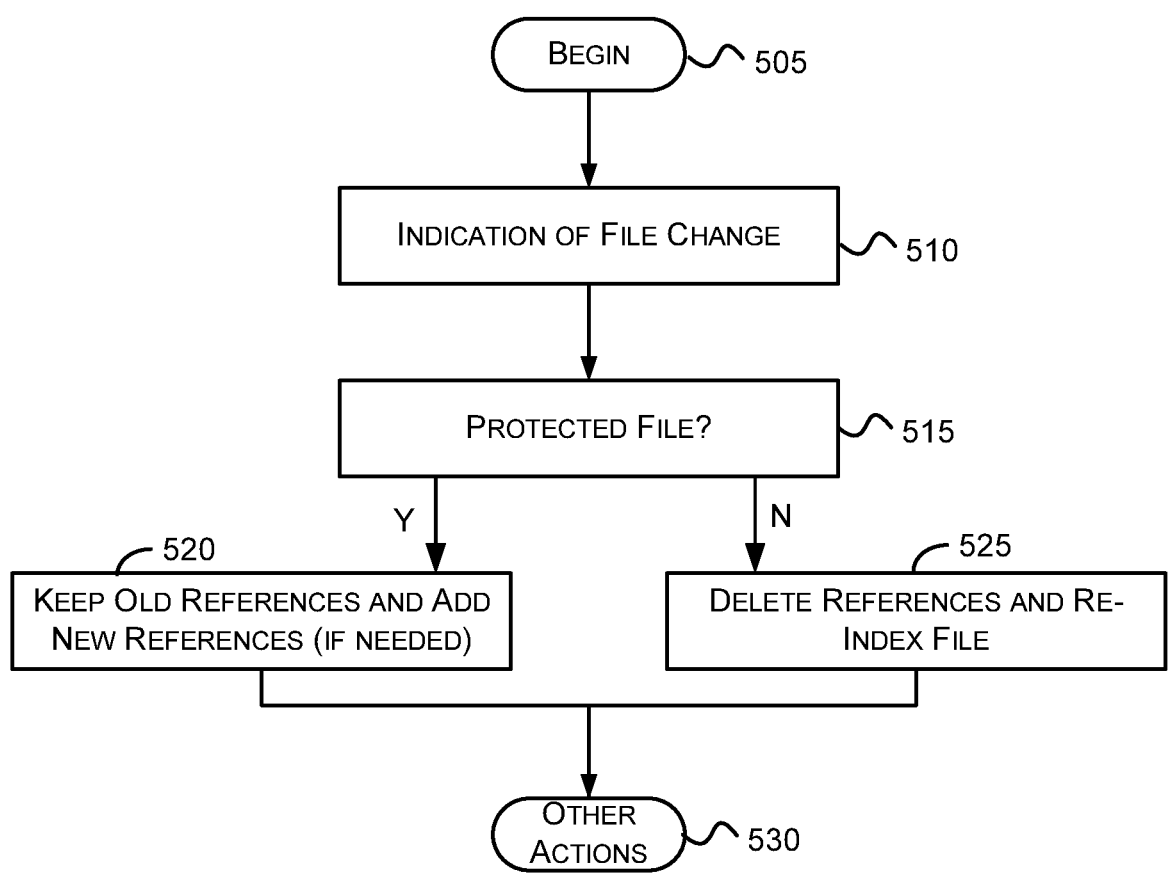
FIG. 5 is a flow diagram that generally represents exemplary actions that may occur in updating an index in accordance with aspects of the subject matter described herein.
Figure 6:
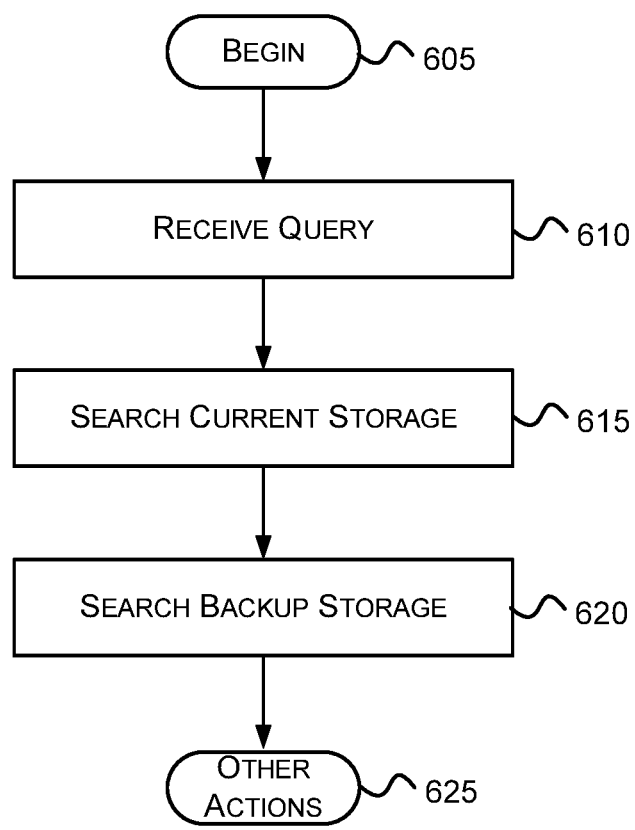
FIG. 6 is a flow diagram that generally represents exemplary actions that may occur in responding to a query in accordance with aspects of the subject matter described herein.

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur in updating an index in accordance with aspects of the subject matter described herein. Turning to FIG. 5, at block 505, the actions begin. At block 510, an indication that a file has changed is received. For example, referring to FIG. 2, the search engine 205 may receive an indication that a file has changed on the current storage 215. This indication may be received, for example, from a component that watches for file changes, by scanning a directory to see if the file has changed based on attributes or contents, or the like.

At block 515, a determination is made as to whether the file is in a protected namespace. A protected namespace may, for example, include a path (e.g., c:\mydata) that indicates that any files that are descendants of the path are to be backed up to backup storage. For example, referring to FIG. 2, the search engine may consult a data structure (not shown) to check whether the file is in a protected namespace.

If the file is in a protected namespace, the actions continue at block 520; otherwise, the actions continue at block 525.

At block 520, new references are added to the index for new tokens included in the file. In addition, previous references to the file are kept in the index. This allows a search to determine whether older versions of a file satisfy a query. One exemplary way of keeping previous references to the file includes overwriting each previous reference from a token in the index to the file if the file, before and after being changed includes the token. For example, referring to FIG. 2, the search engine 205 may add, to the index 225, new references to a protected file for new tokens included in the new file.

At block 525, references (if any) to the file are deleted and the file is re-indexed to add references to the file in the index. For example, referring to FIG. 2, the search engine 205 may delete old references to a non-protected file and add new references to the file to account for changes to the file. One exemplary way of re-indexing a non-protected file to add references to the file in the index includes adding any new tokens included in the file that are not already in the index to the index and adding references from tokens included in the index where the tokens are also included in the file.

At block 530, other actions, if any, may be performed. For example, if an indication that the file has been deleted is received, a search engine may maintain (or re-index) in the index any existing references from tokens to an object that represents one or more versions of the file that exist in the backup storage.

As another example, a query may be received at a search engine. In response, the search engine may search the index 225 to find a set of files that satisfy the query. The set may include one or more files from current storage and/or backup storage.

In addition, if a backup file on the backup storage satisfies a query, the search engine may further search versions of the backup file to find at least one version that satisfies the query. Afterwards, the search engine may provide an indication (e.g., a data structure such as a collection) of the at least one version that satisfies the query.

FIG. 6 is a flow diagram that generally represents exemplary actions that may occur in responding to a query in accordance with aspects of the subject matter described herein. As mentioned previously, the actions described in conjunction with the blocks may occur in parallel or at the same time. For example, searching the current storage may occur in parallel or at the same time as searching the backup storage if, for example, the search is done via an index.

Turning to FIG. 6, at block 605, the actions begin. At block 610, a request to search for files that satisfy a query is received. For example, referring to FIG. 2, the search engine 205 may receive a request to satisfy a query.

At block 615, the current storage is searched for current files that satisfy the query. For example, referring to FIG. 2, the search engine 205 may search the current storage 215 to find current files that satisfy the query.

At block 620, the backup storage is searched for deleted files that have been deleted from the current storage that also satisfy the query. For example, referring to FIG. 2, the search engine may search the backup storage 210 to find files that satisfy the query.

At block 625, other actions, if any, may be performed. For example, a search engine may receive an indication that a non-protected file has changed on the current storage and may, in response, re-index the file. As mentioned previously, this re-indexing may include:

1. Adding, to the index, any new tokens included in the file that are not already in the index, and 2. Adding references from tokens in the index to the file where the tokens are also included in the file As another example, the search engine may also search the backup storage for versions of files that satisfy the query to identify the specific versions that satisfy the query. Searching the backup storage may include searching an index that, for each token found in any version of a file, includes a single reference to an object that represents the versions of the file.

As another example of other actions, an indication may be received that a file has been or is to be copied to the backup storage. In response, the search engine may update an index to reference the file for each new token included in the file while maintaining all previous references to the file in the index.

As can be seen from the foregoing detailed description, aspects have been described related to searching. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method to update an index storage device for a file using a search engine program hosted on a computing device, the method comprising:

maintaining tokens within the index storage device, the index storage device being maintained by the search engine program, the tokens corresponding to words that are included in the file in storage, in which the storage comprises at least one current storage device for storing a current version of the file and at least one backup storage device for storing one or more backup versions of the file;

updating the index storage device responsive to a modification to the file, the modification including adding a word to the file;

updating the index storage device responsive to a modification to the file, the modification including deleting a word from the file;

responsive to the modification to the file comprising a word being added, adding a token to the index storage device that corresponds to the added word;

responsive to the modification to the file comprising a word being deleted, retaining a token in the index storage device that corresponds to the deleted word; and responsive to deleting the current version of the file from the current storage device, adding tokens to the index storage device for all words added since creation of a last backup version of the file to the backup storage device, wherein the index storage device is utilized for tokens for all versions of the file including the current version of the file and the one or more backup versions of the file.

2. The method of claim 1, in which the tokens are searchable terms.

3. The method of claim 1, further including maintaining copies of the updated index storage device after the file is modified.

4. The method of claim 3, in which the modification is the file being deleted.

5. The method of claim 1, in which the tokens are mapped to the file.

6. The method of claim 1, in which the retention of the token occurs when the file is designated as a backup file.

7. A computing device configured to maintain an index storage device that is searchable to locate files, comprising:

one or more processors; and storage that includes one or more hardware-based memory devices storing the index storage device and further storing computer-readable instructions which, when executed by the one or more processors, cause a search engine program hosted on the computing device to:

maintain searchable terms within the index storage device, the index storage device being maintained by the search engine program, each searchable term corresponding to terms that are included in a file in storage, in which the storage comprises at least one current storage device for storing a current version of the file and at least one backup storage device for storing one or more backup versions of the file;

receive a change or an indication of a change to the file, the change corresponding to deleting a word from the file;

receive a change or an indication of a change to the file, the change corresponding to adding a word to the file;

responsive to the change to the file comprising an added word, add to the index storage device a searchable term that corresponds to the added word;

responsive to the change to the file comprising a deleted word, retain in the index storage device a searchable term that corresponds to the deleted word; and responsive to deleting the current version of the file from the current storage device, add searchable terms to the index storage device for all words added since creation of a last backup version of the file to the backup storage device, wherein the addition and retention of the searchable terms occur responsive to the file being backed up, and wherein the index storage device is utilized for searchable terms for all versions of the file including the current version of the file and the one or more backup versions of the file.

8. The computing device of claim 7, in which the searchable term is associated with the file.

9. The computing device of claim 8, in which the instructions further cause the search engine program hosted on the computing device to:
receive a search query that includes a keyword search;
search the index storage device for one or more files that satisfy the search query; and
retrieve the file or an indication of the file from the index storage device that satisfies the search query.

10. The computing device of claim 9, in which the search query is satisfied when the keyword search corresponds to one or more searchable terms within the file, the searchable terms being terms that were added or retained.

11. The computing device of claim 9, in which the searchable terms in the index storage device that are associated with the file are maintained after the file is deleted responsive to a user input.

12. One or more non-transitory computer-readable memory devices storing instructions which, when executed by one or more processors disposed in a computing device, cause a search engine program hosted on the computing device to:
maintain terms within an index storage device, the index storage device being maintained by the search engine program, each term corresponding to words that are included in a file in storage, and the terms being mapped to the file, in which the storage comprises at least one current storage device for storing a current version of the file and at least one backup storage device for storing one or more backup versions of the file;
update the index storage device responsive to a change to the file, the change including deleting a word from the file, wherein the update includes retaining a term in the index storage device that corresponds to the deleted word;
update the index storage device responsive to a change to the file, the change including adding a word to the file, wherein the update includes adding a term to the index storage device that corresponds to the added word;
receive input to delete a current version of the file;
responsive to deleting the current version of the file from the current storage device, add terms to the index storage device for all words added since creation of a last backup version of the file to the backup storage device; and
responsive to the file being designated as a protected namespace and being deleted, maintain the terms for added words and deleted words in the index storage device subsequent to the file being deleted,
wherein the maintained terms at least correspond to the added and deleted words, and wherein the index storage device is utilized for mapped terms for all versions of the file including the current version of the file and the one or more backup versions of the file.

13. The one or more non-transitory computer-readable memory devices of claim 12, in which the index storage device stores additional terms that are associated with and mapped to different files.

14. The one or more non-transitory computer-readable memory devices of claim 12, in which the terms are searchable in the index storage device.

15. The one or more non-transitory computer-readable memory devices of claim 12, in which the instructions further cause the search engine program hosted on the computing device to:
receive a keyword search;
search a current storage device for files corresponding to the keyword search; and
subsequent to searching the current storage device, search the backup storage device for the keyword search.

16. The one or more non-transitory computer-readable memory devices of claim 15, in which the current storage device, index storage device, and the backup storage device are located internal to the computing device, external to the computing device, or a combination of internal and external to the computing device.

* * * * *